US012369621B2

(12) United States Patent
Horowitz et al.

(10) Patent No.: US 12,369,621 B2
(45) Date of Patent: Jul. 29, 2025

(54) CUSTOMIZABLE PRINTABLE SOLUTIONS FOR DELIVERY OF INHALANTS

(71) Applicant: Wild Flower Holdings Inc., New York, NY (US)

(72) Inventors: Kari Horowitz, New York, NY (US); Neal Pomroy, Cos Cob, CT (US); David Wildenstein, Wellington, FL (US)

(73) Assignee: Wild Flower Holdings Inc., New York, NY (US)

( * ) Notice: Subject to any disclaimer, the term of this patent is extended or adjusted under 35 U.S.C. 154(b) by 657 days.

(21) Appl. No.: 17/678,956

(22) Filed: Feb. 23, 2022

(65) Prior Publication Data

US 2023/0263210 A1 Aug. 24, 2023

(51) Int. Cl.

| | |
|---|---|
| ***A24C 5/38*** | (2006.01) |
| ***A24B 15/18*** | (2006.01) |
| ***A24B 15/30*** | (2006.01) |
| ***B41F 3/00*** | (2006.01) |
| ***B41M 3/00*** | (2006.01) |
| ***G06Q 30/0601*** | (2023.01) |

(52) U.S. Cl.

CPC .............. *A24C 5/38* (2013.01); *A24B 15/186* (2013.01); *A24B 15/301* (2013.01); *A24B 15/303* (2013.01); *B41F 3/00* (2013.01); *B41M 3/00* (2013.01); *G06Q 30/0621* (2013.01); *G06Q 30/0625* (2013.01)

(58) Field of Classification Search

USPC .......................................................... 162/134

See application file for complete search history.

(56) References Cited

U.S. PATENT DOCUMENTS

| | | | | |
|---|---|---|---|---|
| 10,206,888 | B2 * | 2/2019 | Vu | A61K 9/0014 |
| 10,897,925 | B2 * | 1/2021 | Pandolfino | G09B 19/00 |
| 2009/0008407 | A1 | 1/2009 | Sevcik et al. | |
| 2009/0069932 | A1 | 3/2009 | Rudick | |
| 2015/0251891 | A1 | 9/2015 | Peters et al. | |
| 2016/0368753 | A1 | 12/2016 | Bethuy et al. | |
| 2020/0202409 | A1 | 6/2020 | Jikomes et al. | |
| 2021/0307378 | A1 * | 10/2021 | Rabie | A24C 3/00 |
| 2021/0397758 | A1 | 12/2021 | Haeni et al. | |

OTHER PUBLICATIONS

U.S. Appl. No. 17/683,181, Non-Final Office Action mailed Jun. 10, 2024, 9 pages.

U.S. Appl. No. 17/683,181, Notice of Allowance mailed Dec. 18, 2024, 12 pages.

* cited by examiner

*Primary Examiner* — Jacob T Minskey

(74) *Attorney, Agent, or Firm* — Conley Rose, P.C.

(57) ABSTRACT

Generating a printable inhalant solution may include selecting identifiers for one or more identified chemicals and creating, for each identified chemical, a chemical specification that includes at least a quantity of the chemical. The chemical specifications in the aggregate may include a chemical signature of the selected identified chemicals. Further, a printable solution may be mechanically printed onto a predetermined flammable base substrate.

14 Claims, 7 Drawing Sheets

100

100

600

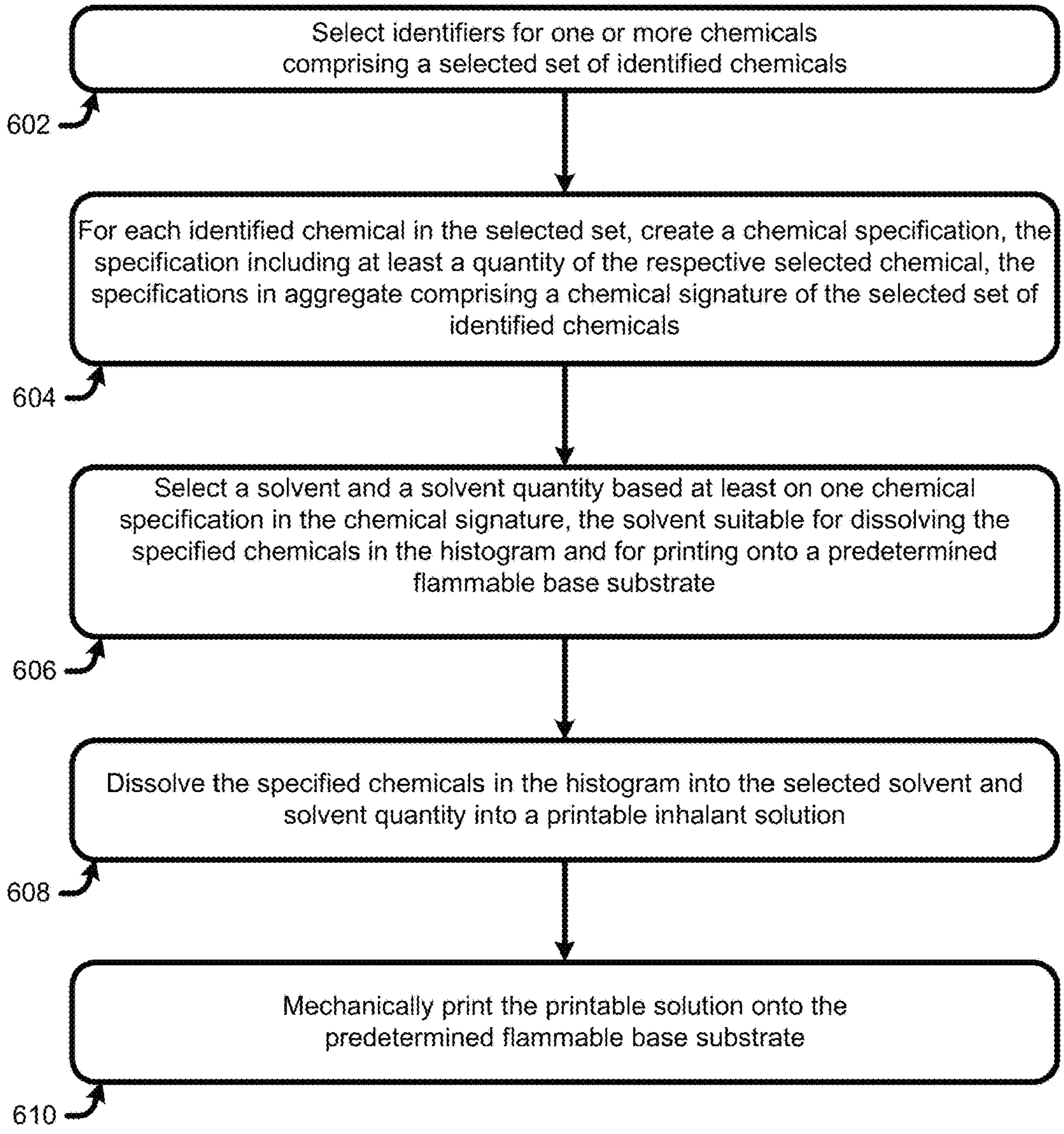

```
┌─────────────────────────────────────────────────────────────┐
│   Select identifiers for one or more chemicals              │
│   comprising a selected set of identified chemicals         │
└─────────────────────────────────────────────────────────────┘
602

┌─────────────────────────────────────────────────────────────┐
│ For each identified chemical in the selected set, create a  │
│ chemical specification, the specification including at least│
│ a quantity of the respective selected chemical, the         │
│ specifications in aggregate comprising a chemical signature │
│ of the selected set of identified chemicals                 │
└─────────────────────────────────────────────────────────────┘
604

┌─────────────────────────────────────────────────────────────┐
│ Select a solvent and a solvent quantity based at least on   │
│ one chemical specification in the chemical signature, the   │
│ solvent suitable for dissolving the specified chemicals in  │
│ the histogram and for printing onto a predetermined         │
│ flammable base substrate                                    │
└─────────────────────────────────────────────────────────────┘
606

┌─────────────────────────────────────────────────────────────┐
│ Dissolve the specified chemicals in the histogram into the  │
│ selected solvent and solvent quantity into a printable      │
│ inhalant solution                                           │
└─────────────────────────────────────────────────────────────┘
608

┌─────────────────────────────────────────────────────────────┐
│ Mechanically print the printable solution onto the          │
│ predetermined flammable base substrate                      │
└─────────────────────────────────────────────────────────────┘
610
```

700

```
702 → Via a network connection, receive at a database engine a query for a chemical
       signature of a printable inhalant solution

704 → Authenticate at an identity software component, the identity of the sender of the
       query

706 → Identify a payment account for the sender of the query based at least on the
       authentication

708 → Based on the query, the database engine retrieve from a data store of chemical
       signatures, one or more chemical signatures of printable inhalant solutions

710 → At the database engine, optionally modify the chemical signature based on
       information in the received query

712 → Via the network connection, return by the database engine the chemical signature

714 → Based at least on completing processing of the received query, debit a payment in
       the identified payment account thereby completing processing of the received
       query
```

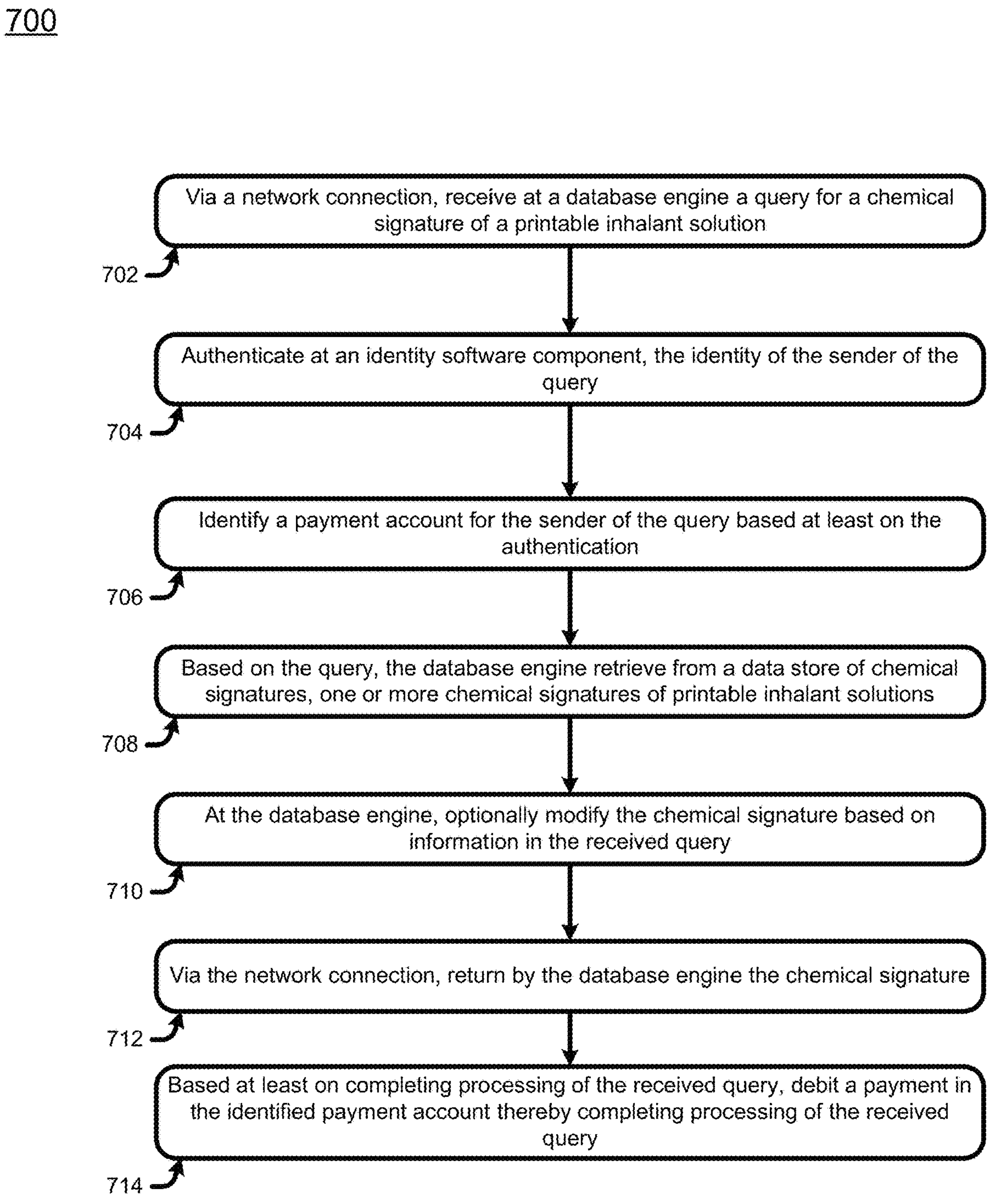

Figure 7

CUSTOMIZABLE PRINTABLE SOLUTIONS FOR DELIVERY OF INHALANTS

BACKGROUND

A common way to ingest substances is to smoke those substances, such as by burning a base substrate that contains one or more active ingredients by which the active ingredients are converted into an inhalant as "smoke", followed by the inhalation of the resulting smoke.

SUMMARY

Presently, the use of inhalants via smoking is common for both medicinal and recreational use. For example, various blends of strains of grown cannabis and related substances, when smoked, are associated with experiences. Those experiences may include not only sensory effects such as taste and smell, but also pharmacological effects. By way of another example, tobacco products are sometimes blended to deliver a desired set of sensory effects. However, such blends may be costly and/or difficult to obtain.

An arbitrary blend of substances can be characterized as a set of chemicals and their associated amounts. A need may arise to specify a known blend by such a set of chemical amounts, and subsequently to mechanically generate those chemicals using less costly and/or more readily available materials to closely match at least some of the experiences of the characterized arbitrary blend.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 is a flow chart for exemplary printer operations for customizable printable solutions for delivery of inhalants.

FIG. 7 is a flow chart for exemplary client and server software operations for customizable printable solutions for delivery of inhalants.

DETAILED DESCRIPTION

Context of Customizable Printable Solutions for Delivery of Inhalants

Historically, people have prepared various plant products, including tobacco and cannabis, and dried and cured various strains of those products for smoking. Specially, smoking involved burning the cured products, thereby creating inhalants for ingestion. In this way, smoking became known as a method of delivery of inhalants.

While initial reasons for smoking may have included pharmaceutical effects, people have taken to optimizing the holistic experience of smoking. This includes selecting specific strains and applying specific preparation methods to create a targeted experience. The experience of ingesting these selected strains includes not only a specific pharmaceutical effect, but also sensory experiences including taste and smell. For example, flavorings such as menthol and mint have been added to mask the harshness of tobacco. By way of another example, strains have been bred for targeted concentrations of active pharmaceutical chemicals. Thus, a targeted experience may refer to the sum of the sensory, pharmaceutical, and other physical effects, resulting from consuming, via smoking, material comprised of a set of chemicals in associated amounts.

While targeted experiences may be successfully created by specific strain selection and specific preparation methods, the strains may be difficult or expensive to obtain and the specific preparation methods may be unknown. However, the resulting product from the strains and preparation methods, such as a cigarette, can be considered a mere set of chemicals that correspond to the targeted experience. Where that set of chemicals is to be reproduced via other (preferably easier to source and less expensive) feedstock, the targeted experience may be reproduced as well.

Herein are disclosed techniques to reproduce a targeted experience. Specifically, techniques to infuse a flammable substrate, such as cigarette paper, with chemicals corresponding to a targeted experience are among those disclosed. Some of the techniques may include use of a mechanical printer as the method of infusion.

There are many variations of filler, such as tobacco, forms of cannabis, or coconut husk, to name three. Note that the filler for the flammable substrates are themselves sets of chemicals. Techniques to create a chemical signature, i.e., a set of chemicals and characteristics of each respective chemical, such as an amount that take into account the amount of the flammable substrate, the filler, and/or fixative agents, as to reproduce a targeted experience are also disclosed.

Figure 1:
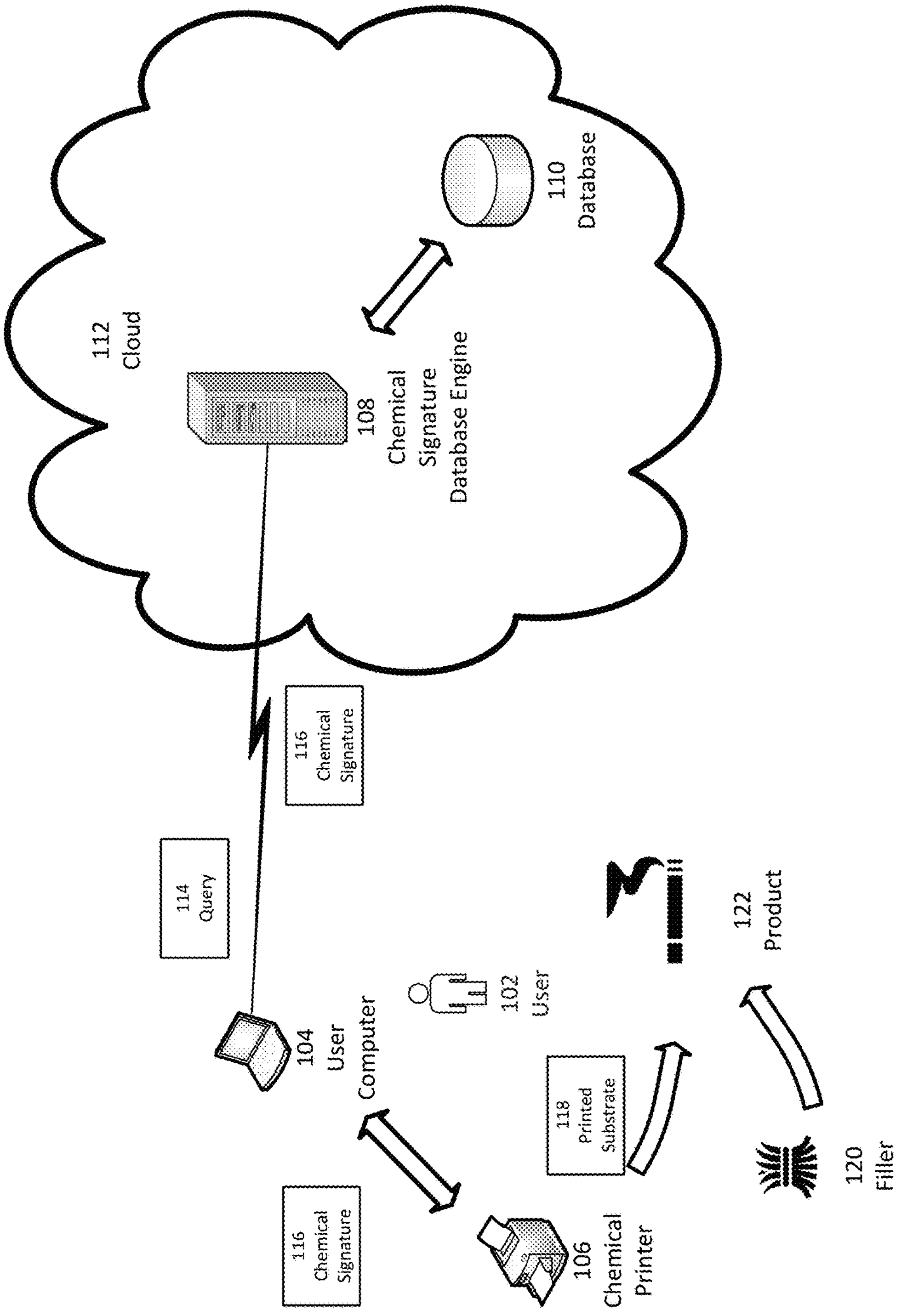
FIG. 1 is a context diagram for an example of customizable printable solutions for delivery of inhalants.

FIG. 1 is a context diagram 100 for an example of customizable printable solutions for delivery of inhalants.

In the example shown in FIG. 1, a user 102 has a computer 104 and a chemical printer 106. The chemical printer 106 has a set of chemicals that it can infuse into a flammable base substrate such as cigarette paper via piezoelectric, thermal, or equivalent printing techniques. The chemicals may include active ingredients such as tetrahydrocannabinol, cannabidiol, terpenes, or oils. Other chemicals may include flavorings such as mint and menthol. Still other chemicals may include fixative agents or preservatives. The chemical printer 106 is described in further detail with respect to FIG. 4 below.

The computer 104 may communicatively access a chemical signature database engine 108 which may be a software database engine server. The chemical signature database engine 108 may be connected to a chemical signature database 110. The chemical signature database 110 may contain at least a plurality of chemical signatures, each comprised of a set of identifiers for various chemicals. Each chemical in the chemical signature may be associated with an amount and other data in a database held in the chemical signature database 110. When received by the printer 106, the printer may then select chemicals corresponding to the identifiers in the signature and subsequently print quantities of the selected chemicals into a substrate according to the chemical signature. Chemical signatures are described in further detail with respect to FIG. 2 below.

Chemical signature database engine 108 and chemical signature database 110 may both be remote from the computer 104, accessible, e.g., via the internet, and/or may be resident in a cloud installation 112. Examples of the hardware, software, and communications infrastructure are described in more detail with respect to FIG. 3 below.

To effect customizable printable solutions for the delivery of inhalants, user 102, via computer 104, may create a query 114 for the chemical signature 116 from chemical signature database engine 108. The query 114 may be comprised of a brand name or other indicator for a desired targeted experience. Specifically, if a user is aware of a particular blend of cannabis X, it can specify a brand name for X and retrieve the chemical signature for X.

It may not be enough to merely retrieve a chemical signature for X. The user 102 may also be aware of the fixative agent (used to ensure the printed chemicals are not easily removed from the substrate), flammable substrate, and/or filler the user 102 is intending to use along with the chemical signature. One or more of these ingredients may be selectable separately or in concert with the indication and retrieval of the chemical signature in some embodiments. The chemical signature database engine 108 may then retrieve the chemical signature X modified by the chemical signatures of the fixative agent, flammable substrate, and/or filler. In this way, the retrieved chemical signature 116 may take into account the other ingredients in the final product, and thereby achieves the intended targeted experience.

Alternatively, the user computer 104 and/or the chemical printer 106 may have the capability to modify chemical signatures, and the user 102 merely retrieves the chemical signature 116 for X. In this scenario the computer 104 receives the chemical signature 116 for X, and then modifies the chemical signature 116 for the chemical signatures for the fixative agent, flammable substrate, and/or filler.

In other embodiments, the user 102 may specify custom modifications to the chemical signature 116. This may be performed on the user computer by a chemical signature editor (not shown). Example modifications would be to increase the amount of active chemicals and/or to add flavorings. In this way, a user 102 may customize a targeted experience.

Regardless of whether the chemical signature database engine 108 or the user computer 104 modifies the chemical signature 116 or the user customizes the chemical signature 116, the modified chemical signature is then sent to chemical printer 106 which then prints the chemicals specified in the signature onto the flammable substrate 118. Along with the chemicals specified in the signature, the chemical printer 106 may also print fixative agents, flavorings, preservatives, and/or other additives.

After printing, the printed flammable base substrate 118 may be used to roll filler 120. Examples of filler may be active ingredients such as strains of cannabis and/or tobacco, and/or neutral fillers such as corn husk, grass, and coconut husk. Upon rolling filler 120 with the printed flammable base substrate 118, the combination yields a final product 122. The final product 122 when consumed may then yield a targeted experience, subject to a tolerance in some embodiments. Tolerances are described in further detail with respect to FIG. 2 below.

Exemplary Chemical Signatures and Operations on Chemical Signatures

Figure 2:
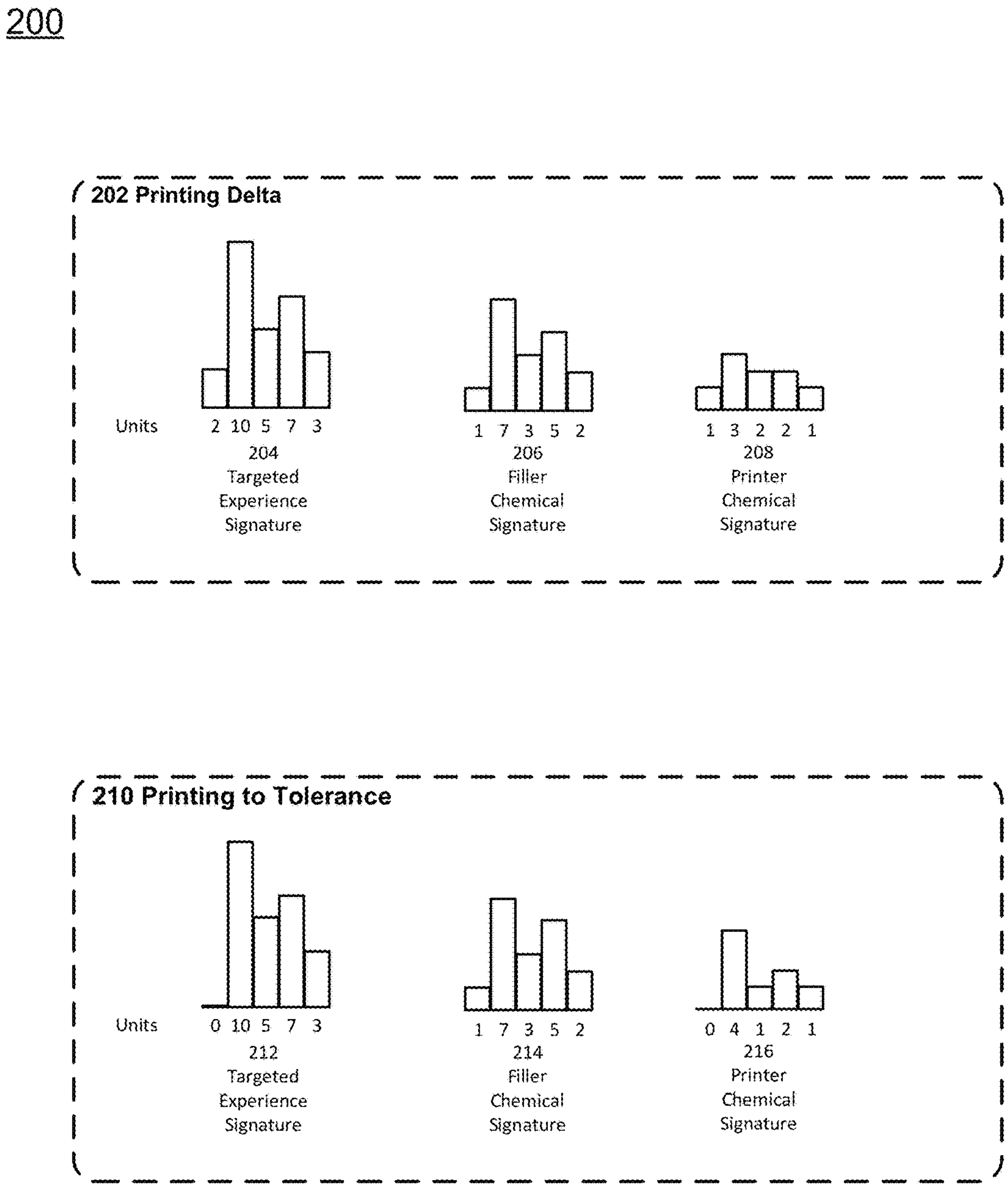
FIG. 2 is a diagram of exemplary chemical signatures and operations on chemical signatures.

Customization with respect to customizable printable solutions for delivery of inhalants may refer to the specifying of a targeted experience via a set of chemicals associated at least with quantities. FIG. 2 is a diagram 200 of exemplary chemical signatures and operations on chemical signatures.

A chemical signature may be comprised of a set of chemical identifiers and associated data. An example of a set of chemical identifiers may include:

CBD (representing cannabidiol)

LMN (representing limonene (a terpene)

MRC (representing myrcene (another terpene)

MTH (representing menthol (a flavoring)

DPG (representing dipropylene (a fixative agent))

The set of chemical identifiers may be used to create a histogram which represents an amount of the chemical identified by the identifier to be printed by the chemical printer 106. In many cases, the chemical printer 106 is programmed to print out a constant amount of the chemicals identified in the chemical signature. In this case, the chemical printer 106 may, for example, take the amount of the chemical identified by the chemical signature, divide it by the amount of time anticipated for the chemical printer 106 to print out a line along the length of a substrate 118, and print the chemical according to that ratio.

However, in some cases, the chemical signature may be comprised of a time series of histograms, each histogram indicating the amount of the chemical in the chemical signature to print at a particular point in time. Software on the chemical printer 106 (or external software), may calculate ratios, and print the chemical by the calculated ratio. For example, if a chemical signature indicates that it is anticipated that the product 122 is to be consumed over 7 minutes, and that 5 units of cannabidiol (CBD) will be provided in the first half of consumption and 2 units of CBD in the second half of consumption, the chemical printer 106 will print 5 units over the first half of a printed line, and 2 units over the second half, where the length of the line is expected to burn for 7 minutes. In this way, the delivery of a particular chemical in a chemical signature can be customized over the time of consumption of the product 122.

FIG. 2 is a diagram 200 of various chemical signatures in the form of histograms 204, 206, and 208. Block 202 illustrates operations to specify signatures according to a delta. Specifically, consider an example in which a histogram 204 describes a targeted experience signature that would be usually delivered via an expensive form of cannabis, and the user 102 wishes to reproduce the targeted experience with a less expensive composition of cannabis to be used as a filler 120. A goal would then be to determine the delta between the filler 120 and the composition of the cannabis for the targeted experience, and print the same.

In the example shown in FIG. 2, the histogram 204 specifies a set of five chemicals and their associated quantities (represented by bars from left to right corresponding to a "first chemical," a "second chemical," etc., respectively), and represents a chemical signature that may be suited for the targeted experience. The height of each bar indicates the amount of the corresponding chemical in the targeted experience signature, in arbitrary units represented by the number beneath the bar (i.e., two units of the first chemical are present, ten units of the second chemical are present, etc.). Histogram 206 represents a chemical signature for the substitute filler, and specifies the same set of chemicals in the targeted experience signature, but with the respective associated quantities indicating the quantities in the filler 120 to be used by the user 102. Here, note that the histogram 206 shows shorter bars for the chemicals compared with those of the histogram 204. This indicates higher concentrations of the chemicals in the targeted experience signature.

To determine the chemical signature to be printed by chemical printer 106, we can take the difference between the two histograms 204 and 206. For example, the delta of the first chemical is the difference between 2 units of that chemical in the "targeted" histogram 204 and 1 unit in the "filler" histogram 206, yielding a corresponding 1 unit (i.e., 2 units−1 unit=1 unit) to be printed as indicated in the "printer" histogram 208, which represents the chemical signature of the difference between the targeted experience signature and the filler chemical signature (i.e., specifying the difference in the same set of chemicals between the two signatures). In the printer histogram 208, we can see that we have taken the differences between the targeted histogram 204 and the filler histogram 206 for all chemicals identified in those histograms in this example embodiment. Accordingly, the printer need only print the additional chemicals as represented by the printer chemical signature 208 to recreate or at least approximate the targeted experience.

While block 202 shows only operations with respect to filler, the same analogous operations may be performed for other ingredients such as fixative agents, preservatives, and the flammable substrate itself. The printer histogram 208 may also be hand modified and/or customized by the user 102 as desired.

In some examples, while some portion of the targeted experience may be recreated, a portion of a targeted experience might not. For example, certain sensory, pharmaceutical, or physical effects might not be reproduced. In some cases, this may be because not all the chemicals comprising the experience are accounted for. In other cases, the amount of chemical added via the printer is not precise.

In such cases, the user 102 may adopt a strategy of reproducing a targeted experience according to a predetermined tolerance. Specifically, the user may accept a printer histogram that is the difference between the targeted experience histogram and the filler histogram plus or minus some quantity of units, i.e., a predetermined tolerance.

Block 210 illustrates an example of printing to a tolerance. By way of example, a user 102 may accept a predetermined tolerance of plus or minus 1 unit in the number of units for a first chemical, and the targeted histogram 212 shows zero units of that chemical. In this example, the presence of the first chemical may be considered an impurity. However, if the filler histogram 214 shows that 1 unit of that first chemical is present, the first chemical as a lesser quality substance may be acceptable, even as an impurity, because it is within the predetermined tolerance of plus or minus 1 unit.

Accordingly, we can take a difference between the targeted histogram 212 and the filler histogram 214, and generate a printer histogram 216 that, while not precise, is nevertheless within the predetermined tolerance. In such examples, it may be that the first chemical in the printer histogram should be −1 (e.g., 0 desirable units in the targeted experience signature but 1 unit in the filler chemical signature), but one cannot print a negative quantity. Accordingly, 0 units is accepted for the printer chemical signature instead since 1 unit from the filler histogram 214 and 0 from the printer histogram 216 yields 1 unit, which is still within the predetermined tolerance of the targeted histogram amount of 0 units.

Tolerances can support overshooting. For example, for the second chemical in the FIG. 2 example of printing to tolerance, the filler histogram indicates 7 units, and the printer histogram indicates 4 units yielding a total of 11 units. However, the targeted histogram indicates 10 units. Again, since this is within the predetermined tolerance of plus or minus 1, this amount of the second chemical in the printer chemical signature is acceptable.

Tolerances similarly support undershooting. For the third chemical, the filler histogram indicates 3 units, and the printer histogram indicates 1 unit, yielding a total of 4 units. However, the targeted histogram indicates 5 units. Yet again, since this is within the predetermined tolerance of plus or minus 1, this amount of the third chemical in the printer chemical signature is acceptable.

This notion of predetermined tolerances can be applied to a time series of histograms as well, thereby enabling the calculation of histograms for printing over the time of consumption of a product 122.

Figure 3:
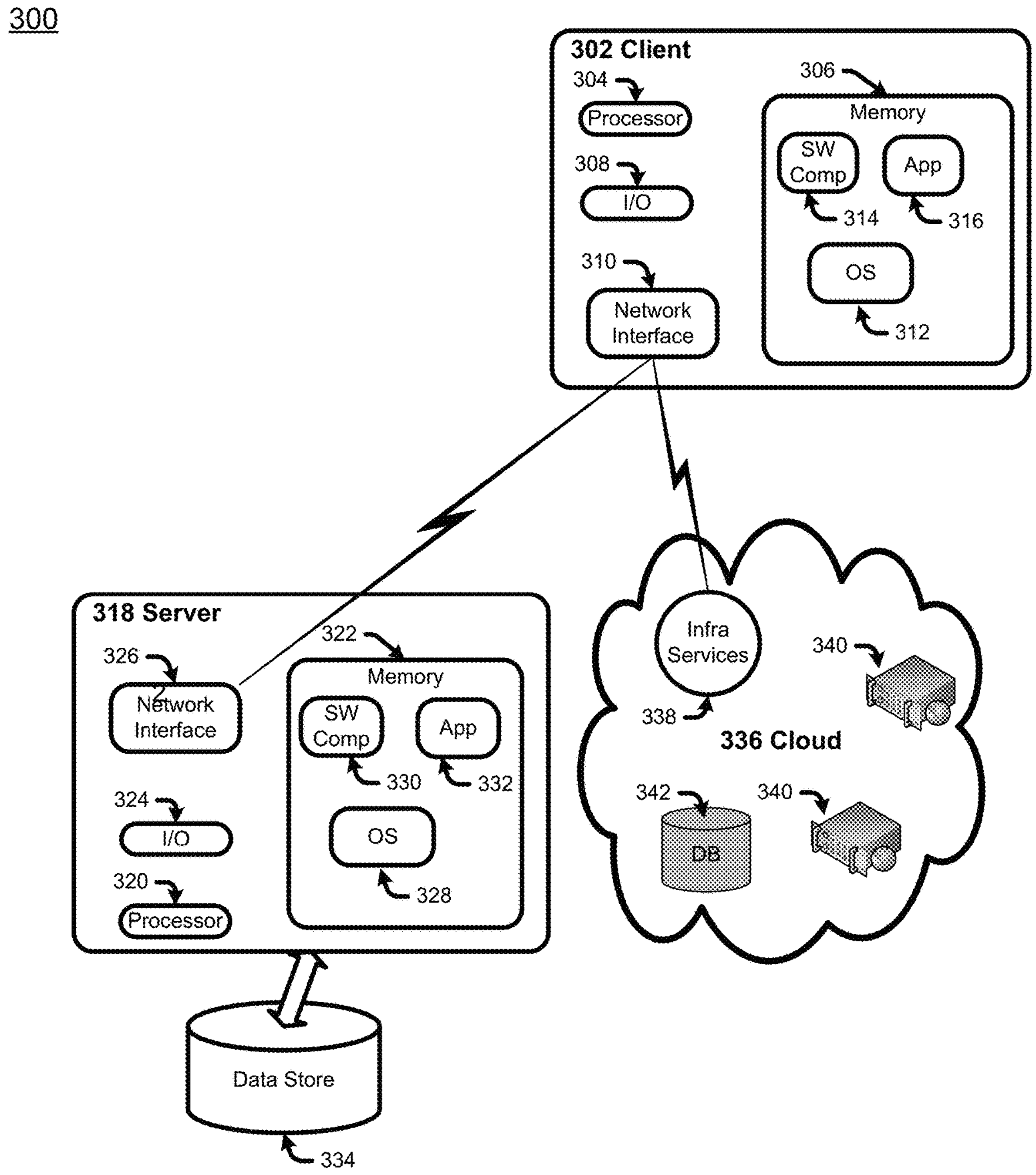
FIG. 3 is a hardware, software, and communications diagram for an exemplary environment for customizable printable solutions for delivery of inhalants to be implemented.

Exemplary Environment for Customizable Printable Solutions for Delivery of Inhalants FIG. 3 is a hardware, software, and communications diagram for an exemplary environment for customizable printable solutions for delivery of inhalants to be implemented.

The functionality for customizable printable solutions for delivery of inhalants may be generally hosted on computing devices. Exemplary computing devices include without limitation on the client-side: mobile devices (including smart phones), tablet computers, laptops, desktop personal computers and kiosks. Exemplary computing devices on the server-side include without limitation: mainframes, physical servers, and virtual machines. Generally, the computing devices may be networked.

A client-side computing device, or "client," 302 may have a computer processor 304 and a computer readable memory 306. The processor may be a central processing unit, a repurposed graphical processing unit, and/or a dedicated controller such as a microcontroller. The computing device may further include an input/output (I/O) interface 308, and/or a network interface 310. The I/O interface 308 may be any controller card, such as a universal asynchronous receiver/transmitter (UART) used in conjunction with a standard I/O interface protocol such as RS-232 and/or Universal Serial Bus (USB). The network interface 310, may potentially work in concert with the I/O interface 308 and may be a network interface card supporting Ethernet and/or Wi-Fi and/or any number of other physical and/or datalink protocols. Alternatively, the network interface 310 may be an interface to a cellular radio.

Memory 306 is any computer-readable media which may store several software components including an operating system 312 and software components 314 and/or other software applications 316 including an internet browser or application integrating internet browsing capability. In general, a software component is a set of computer executable instructions stored together, e.g., on one or more non-transitory computer-readable media, as a discrete whole. Operating systems 312 and applications 316 are themselves software components or integrated aggregations of software components. Examples of software components 314 include binary executables such as static libraries, dynamically linked libraries, and executable programs. Other examples of software components 314 include interpreted executables that are executed on a run time such as servlets, applets, p-Code binaries, and Java binaries. Software components 314 may run in kernel mode and/or user mode.

Computer-readable media may include, at least, two types of computer-readable media, namely computer storage media and communications media. Computer storage media includes both volatile and non-volatile, both removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD), Blu-Ray, or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The server-side computing device, or "server," 318 may be any computing device that may participate in a network. The network may be, without limitation, a local area network ("LAN"), a virtual private network ("VPN"), a cellular network, or the Internet. The server 318 may have hardware components analogous to the client-side computing device 302. Specifically, it will include a computer processor 320, a computer memory 322, an input/output interface 324 and/or a network interface 326. In the memory 322 may be an operating system 328, software components 330, and/or software applications 332. Server 318 hardware may differ from client hardware 302 in that processing power is generally more powerful to handle concurrent processes running and network capacity is greater to communicate with multiple clients 302. Server-side software components 330 may include libraries and run-times (e.g., to run interpreted code). Server-side applications 332 may include web servers (also called "application servers") and database servers. Database servers hosted as a server-side application 332 may access external database storage 334 in the form of a separate hard drive, or potentially an array of hard drives. In some situations, the array of hard drives may be configured as a redundant array of independent disks (RAID), a set of potential configurations to prevent data loss in the event of a single disk failure.

In general, customizable printable solutions for delivery of inhalants may be implemented as a software service on a physical server as the server 318. However, such a software service may also be hosted on the cloud 336 via a cloud service 338. Specifically, a cloud service 338 is comprised of multiple physical computer servers which are disaggregated via a hypervisor.

The cloud service 338 itself may embody an abstraction of services. Common examples include service abstractions such as Platform as a Service ("PAAS"), Infrastructure as a Service ("IAAS"), and Software as a Service ("SAAS").

Where the physical computer servers each may have one or more processors, memory, at least an I/O interface and/or network interface, the features and variations of the processors, memory, the I/O interface, and the network interface for virtual machines are substantially similar to those described for the physical computer server 318 described above.

A cloud service 338 includes a hypervisor which can delegate calls to any portion of hardware in the underlying physical serves, and upon request generates a virtual machine from the separate portions of hardware, regardless of physical server (a process called "disaggregation"). Just as a physical server 318, a virtual machine may host not only software applications, components including services, but also virtual web servers 340 functionality and virtual storage/database 342 functionality.

Note that virtual machines themselves may be further partitioned into containers, which enable execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on demand since the underlying virtual machine is already provisioned.

Figure 4:
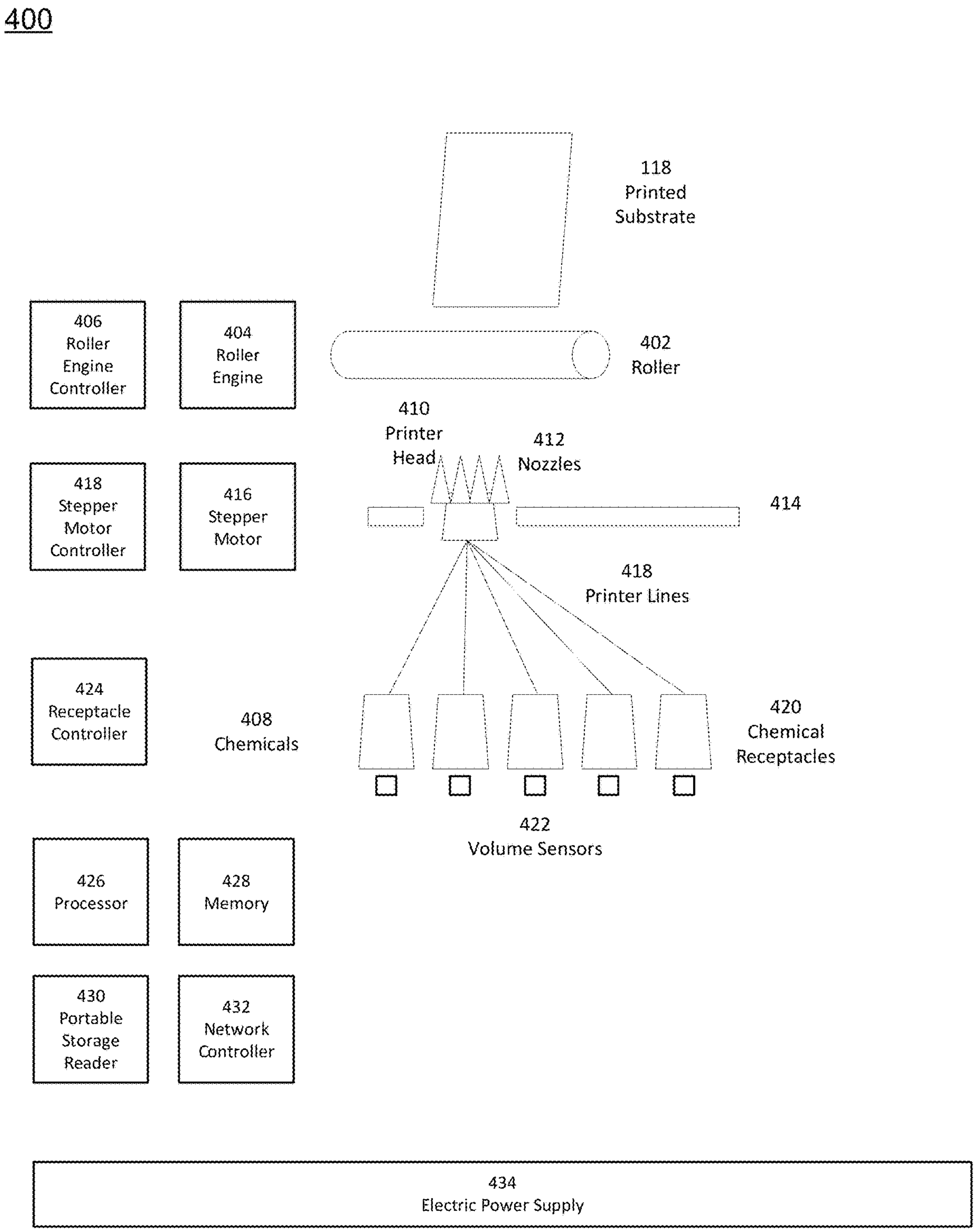
FIG. 4 is a block diagram of an exemplary chemical printer for printable inhalant solutions.

Exemplary Printer for Customizable Printable Solutions for Delivery of Inhalants The chemical printer 106 may be an apparatus to infuse substrates 118 with chemicals. FIG. 4 is a block diagram 400 of an exemplary chemical printer 106 for printable inhalant solutions.

A chemical printer 106 may be configured to receive a printed substrate 118 such as a sheet of cigarette rolling paper, for example. In this example, the chemical printer 106 receives the substrate 118 and controls the vertical position of the printer via a roller 402 which moves the substrate 118 vertically, via a roller engine 404. The roller engine 404 may be controlled via a hardware controller chip (or equivalent component on a system on chip (SoC)) 406.

Chemicals 408 may be infused onto and/or into the printed substrate 118 via a printer head 410 which has a plurality of nozzles 412. Nozzles 412 may correspond to the chemical to be printed. Printer head 410 may comprise piezo-electric printer heads or thermal (sometimes called bubble) printer heads.

Infusing the substrate 118 horizontally may be achieved by moving the printer head 410 horizontally via a belt 414 attached to a stepper motor 416. The stepper motor is controlled via a hardware controller chip (or similar component, e.g., on an SoC) 418.

Chemicals may be sent to the printer head 410 via printer lines 418 connected to chemical receptacles 420, each of which contains a respective chemical of the set of chemicals 408, for example. In some embodiments, a receptacle 420 may be associated with a sensor 422 which may indicate the amount of chemical in the receptacle 420 or other attributes. The sensors 422 are communicatively coupled to the receptacle controller 424 which may provide software notifications based on information received from the sensors 422. In some embodiments, the receptacle controller 424 may be a hardware controller chip (or similar component, e.g., on an SoC).

Information and control commands from the roller engine controller 406, stepper motor controller 418, and receptacle controller 424 flow back and forth from the processor 426 via a bus (not shown), which may be external, or internal if on an SoC. Processor 426 may be in communicative control with a computer memory 428 configured to store computer executable instructions. The chemical printer 106 in general may be configured to be a computer client 302 as shown in FIG. 3. In some examples, the specific software stored in the computer memory 428 of the chemical printer 106 may include controller software, modification software, and/or chemical signatures 116 for printing. The printer software is described in further detail with respect to FIG. 5 below.

Software and chemical signatures 116 may be received by the chemical printer 106 externally. Two options include a portable storage reader 430 and a network controller 432. Specifically, the portable store reader 430 may interface with the chemical printer 106 via an I/O interface as set forth in client interface 308 in FIG. 3. Other interfaces such as USB and serial interfaces may be used as well. The network controller 432 may correspond to client network controller 310 in FIG. 3.

Via the portable storage reader 430, software and chemical signatures 416 may be uploaded to chemical printer 106 via USB drivers, SD cards, and other similar media. The network controller 432 enables the reception of software and chemical signatures 416 to the chemical printer 106. Local software on the printer may enable the reception and storing into memory 428. The functions of the chemical printer may be powered by electric power supply 434.

The foregoing description of chemical printer 106 is not intended to be exhaustive or limiting. Rather, the description is intended to illustrate the customized printing of chemicals for delivery of inhalants. Features such as chassis, power management, and paper feed management may be incorporated into the chemical printer 106, as would be understood by one of ordinary skill in the art.

Figure 5:
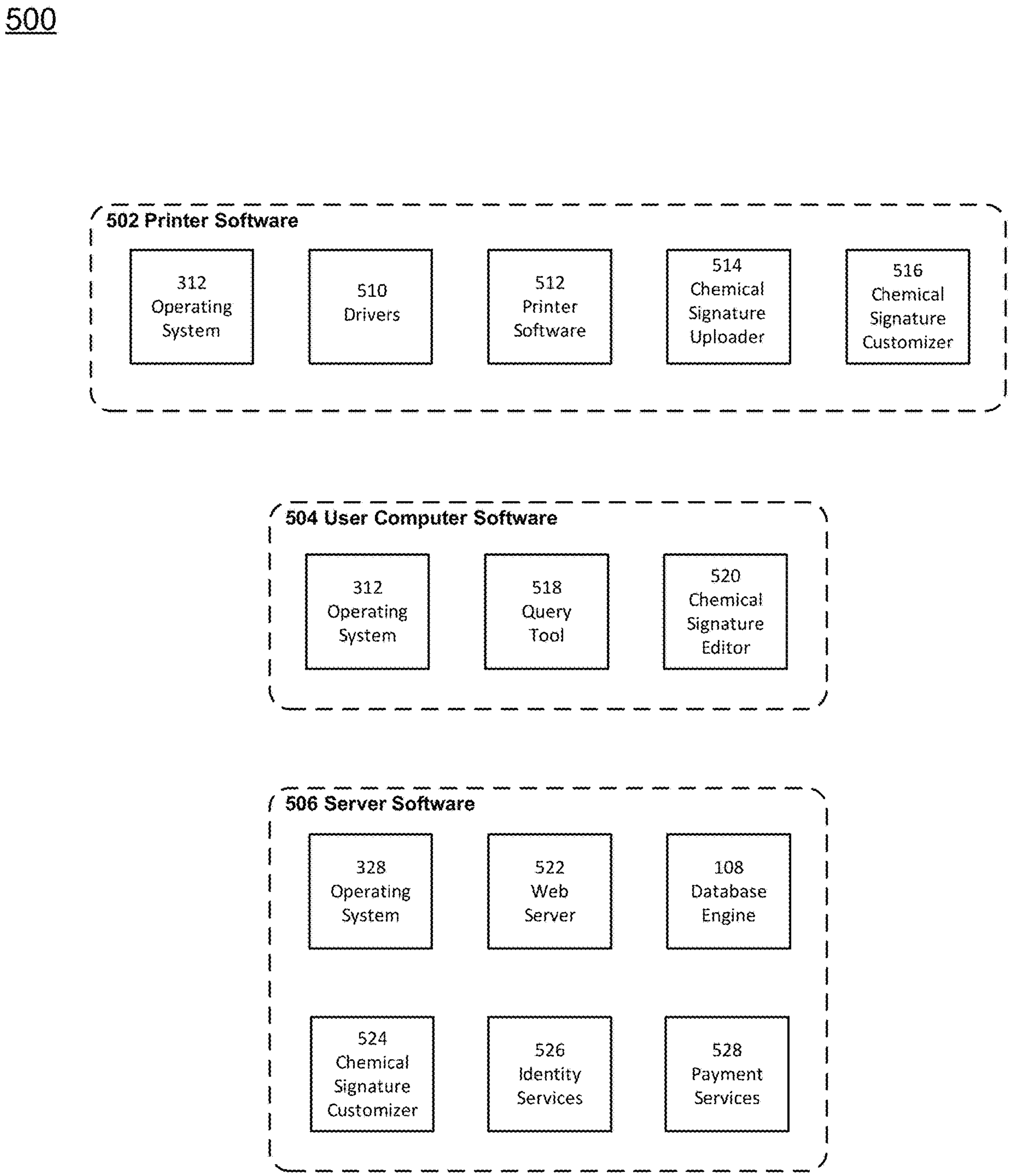
FIG. 5 is a block diagram of example client and server software components and/or applications for customizable printable solutions for delivery of inhalants.

Exemplary Software Specific to Customizable Printable Solutions for Delivery of Inhalants FIG. 5 is a block diagram 500 of example client and server software printer components 502 and/or applications for customizable printable solutions for delivery of inhalants. As such, the example client and server components and/or applications may comprise the operational software of chemical printer 106, software user computer components 504 comprising the operational software of user computer 504, and server components 506 comprising the operational software of the server side functionality for customizable printable solutions for delivery of inhalants.

Printer software components 502 may be resident in printer memory 428 and comprised of computer executable instructions and computer readable data. For example, the printer software components 502 may be comprised of an operating system 312 and printer controller drivers 502. Recall that the printer has several controllers, including the roller engine controller 406, stepper motor controller 418, and receptacle controller 424. Printer software components 502 may include drivers that provide the software interface between the operating system 312 of the chemical printer 106 and the controllers 406, 418, 424. Printer software 512 may provide a user interface to provide notifications to the user about the status of the chemical printer 106 and to enable the user to configure the chemical printer 106.

Applications chemical signature uploader 514 and chemical signature customizer 516 may relate to the operation of the chemical printer 106 to receive chemical signatures as well as modify chemical signatures according to user specifications. In the case of the chemical signature uploader 514, a user may use USB, the portable storage reader 430, or the network interface 432 to upload chemical signatures for printing. In some embodiments, the chemical signature uploader 514 may handle the different I/O and network signals and protocols to receive software notifications that a signature is being uploaded, buffer the received signature, and store the received signature in a location in memory 428 where the signature may be located.

Once the signature is stored, the chemical signature customizer 516 may modify the chemical signature. For example, a user may use the chemical signature customizer 516 to store default settings for chemical signatures of filler 120, printed substrate 118, fixative agents, preservatives, and the like. The chemical signature customizer 516 may then modify received signatures to satisfy default setting for the chemical signatures. The chemical signature customizer 516 may also received custom modifications as specified by the user via the chemical signature customizer 516 user interface for any purpose whatsoever. The chemical signature customizer 516 may then accordingly adjust the received signatures to take those custom settings into account.

Turning to the user computer software components 504, the user computer 104 also has a memory 306. Resident in memory 306 is an operating system 312 that enables the operation of applications. Query tool 518 is a tool to query the database engine 108 for chemical signatures. The query tool 518 may be a local application or may be a web application operating within a web browser on the user computer 104.

Once the user 102 has retrieved one or more chemical signatures via the query tool 518, the user may edit the chemical signatures via the chemical signature editor 520. Here the chemical signature editor operates similarly to the chemical signature customizer 516 on the printer, except that the editing may be done interactively by user 102 on computer 104. The operation of client side software is described in more detail with respect to FIG. 7.

The server software 506 may be resident in a server memory 322 or in a virtual machine in the cloud 336, for example. The server software 506 may include an operating system 328. Typical server software includes a web server 522 and a database engine 108 which may host database applications. For web application embodiments, web server 522 may host applications that support a web interface for the query tool 518. Typical web servers include Apache and Tomcat. Web applications may then interact with a database server (such as chemical signature database engine 108) which may be in the form of a relational database management system (RDBMS) such as Microsoft SQL Server™ and Oracle Database™.

Upon receiving a query, the chemical signature database engine 108 (or web application server 522 for some web application embodiments) may query a data store of signatures 110. Optionally the chemical signature customizer 524 may modify chemical signatures before returning.

In some cases, the chemical signature database engine 108 (or web applications server 522 for some web application embodiments) may have need of authentication services. An identity services server 526 which stores user accounts and credentials may provide such authentication services. If downloaded chemical signatures are to be paid for, payment services 528 provide an interface to debit accounts. The operation of server side software is described in more detail with respect to FIG. 7.

FIGS. 6-7 present illustrative processes 600 and 700, respectively, for implementing customizable printable solutions for delivery of inhalants. Each of the processes 600 and 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600 and 700 are described with reference to the architecture 100 of FIG. 1.

Exemplary Printer Operation for Customizable Printable Solutions for Delivery of Inhalants FIG. 6 is a flow chart 600 for exemplary printer operations for customizable printable solutions for delivery of inhalants. More specifically, flow chart 600 describes example printer operations to prepare a solution for printing and mechanically printing the solution for delivery of inhalants.

In block 602, a user 102 may select software identifiers for one or more chemicals comprising a selected set of identified chemicals. The selected set of identified chemicals may be represented in a histogram as described elsewhere herein. The chemicals may correspond to chemicals to be printed by the chemical printer 106 and/or to chemicals contained in filler 120, substrate 118, or fixative agents and/or preservatives. In this way, the chemicals to comprise the chemical signatures to be processed and retrieved are set.

In block 604, the user 102 may, for each identified chemical in the selected set, create a chemical specification, the specification including at least a quantity of the respective selected chemical, and the specifications in aggregate comprising the chemical signature of the selected set of identified chemicals in some embodiments. The quantity of units may be based on a targeted experience. Accordingly, the user may specify the quantity of units by retrieving chemical signatures from the database engine 108 via the query tool 518 in some embodiments. Alternatively, or in addition, the user may upload chemical signatures via USB, portable storage via portable storage reader 430, or from the network via network controller 432.

Note that chemical signatures from third parties or database 430 may have different or additional chemicals in their signatures. Having user 102 specify the chemicals or chemical signatures available to work with via selecting chemicals to comprise the chemical signature in block 602 enables the definition of a common set of histograms, and therefore enables operations between those chemical signatures.

In block 606, the user 102 may select a solvent and a solvent quantity based at least on one chemical specification in the chemical signature, the solvent suitable for dissolving the specified chemicals in the chemical signature and for printing onto a predetermined flammable base substrate. For example, the user 102 may select a solvent suitable for dissolving the chemicals to be printed i.e., the chemicals specified in block 602.

In block 608, the chemicals in the chemical signature may be dissolved into the selected solvent in accordance with or in response to the selection, either individually or in combination. The solvent may be oil or water, but in some cases may be combined with a fixative agent such as dipropylene. In this way, when the chemicals are printed onto a flammable substrate 118, the chemicals may not evaporate quickly and thereby negatively impact the printing process.

In block 610, the chemical printer 106 may mechanically print the dissolved chemicals onto the flammable substrate 118.

Exemplary Software Operation for Customizable Printable Solutions for Delivery of Inhalants FIG. 7 is a flow chart 700 for exemplary client and server software operations for customizable printable solutions for the delivery of inhalants. Specifically, flow chart 700 describes the software steps on both client and server side when querying and modifying chemical signatures for targeted experiences.

In block 702, via a network connect, a chemical signature database engine 108 (or web application which forwards a received query) may receive a query for a chemical signature of a printable inhalant solution. The network connection may be via the internet or may be a local network connection, for example. In some embodiments, the query will be from query tool 518.

The query tool 518 may allow for a wide range of queries. Some options include querying by brand name, querying by concentration by amount of chemicals, and querying by similarity to a chemical signature. Regarding the last two options, since chemical signatures correspond to histograms, query results may be ranked via use of histogram similarity measures.

Note, also, that the database engine 108 may store user generated content such as identity of uploader, rankings, and reviews. Accordingly, the query tool 518 may query according to those values as well.

Prior to processing a query, in block 704, a web application or server side application may authenticate, at an identity software component, the identity of the sender of the query by receiving credentials and forwarding them to identity services 526. Identity services 526 may delegate authentication to third party services such as Google™ and Facebook™ or alternatively authenticate against credentials directly managed by identity services 526. In this way, an account associated with the querying party, here user 102, may be retrieved. In block 706, this account may be used to identify a payment account for the sender of the query for performing payments based at least on the authentication.

Based on the query, if authentication succeeds, in block 708, the database engine 108 may respond to the received query and retrieve from a database 110 of chemical signatures, one or more chemical signatures of printable inhalant solutions. In some embodiments, the query may include a chemical signature comprised of a set of chemicals.

In some embodiments, the database engine 108 may retrieve full signatures but only perform query matches using histogram distance measures against the subset of chemicals specified in the query. In other embodiments, the database engine 108 may include rules that determine whether chemicals not included in the query may cause undesirable qualitative effects when printed.

In some embodiments, a user 102 may have uploaded chemical signatures of filler 120, printed substrate 118, fixative agents, preservatives, and the like, or of customizations. In this case, in block 710, the database engine 108 (or web application for some web embodiments) via a chemical signature customizer 524 may modify a chemical signature before returning it for response, based on information in the received query. In this way, the user 102 need not edit returned results prior to printing.

In block 712, the chemical signatures retrieved by the database engine 108 (and optionally modified by chemical signature customizer 524) may return the search results including the chemical signature. In some cases, the user may specify receiving additional information about the retrieved chemical signature or signatures. These include user generated content, such as textual or media reviews of the chemical signature, comments, and ratings. Other additional information may include instructions on how to make use of the chemical signature.

If the retrieved results are to be paid for, in block 714, the database server 108 (or web application) may invoke payment services 528 and debit the payment account retrieved in block 706 accordingly. In some embodiments, the debiting may be in response to or based at least on completing processing of the received query. In this way, a wide range of monetization techniques and business models are enabled.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to generate a printable inhalant solution, comprising:

selecting one or more chemicals comprising a selected set of identified chemicals;

for each identified chemical in the selected set, creating a chemical specification for inclusion in a chemical signature, the chemical specification including at least a quantity of the respective identified chemical, and the chemical signature comprising the chemical specifications of the identified chemicals in aggregate;

selecting a solvent and a solvent quantity based at least on one chemical specification in the chemical signature, the solvent suitable for dissolving the chemicals having the chemical specifications in the chemical signature and for printing onto a predetermined flammable base substrate;

dissolving the chemicals having the chemical specifications in the chemical signature into the selected solvent in the selected solvent quantity, thereby creating a printable inhalant solution of the dissolved chemicals and solvent; and mechanically printing the printable inhalant solution onto the predetermined flammable base substrate.

2. The method of claim 1, wherein at least some of the selected identified chemicals in the chemical signature are organic chemicals including at least one of the following:

a terpene, cannabidiol, a flavonoid; and tetrahydrocannabidiol.

3. The method of claim 1, wherein at least one of the chemical specifications in the chemical signature includes a time curve indicating the amount of the respective identified chemical to be delivered over time.

4. The method of claim 1, wherein at least one of the chemical specifications in the chemical signature is a delta of a corresponding chemical specification for a second material.

5. The method of claim 4, wherein the second material is the flammable base substrate, and the delta is with respect to a chemical signature of a known predetermined blend of chemicals.

6. The method of claim 5, wherein the flammable base substrate is corn husk.

7. The method of claim 5, wherein the known predetermined blend of chemicals is based at least on the chemical signature of a known or newly created blend of cannabis.

8. The method of claim 5, wherein the second includes a flavoring.

9. The method of claim 8, wherein the flavoring is at least one of the following:

menthol, and mint.

10. The method of claim 5, wherein the chemical signature of the predetermined blend of chemical specifications is a customized chemical signature received from a user.

11. The method of claim 1, wherein selecting the one or more chemicals includes:

selecting one or more chemicals comprising a selected set of chemicals or active compounds including at least one of Tetrahydrocannabinol, Cannabidiol (CBD), and Cannabinol (CBN); terpenes or other organic molecules and aromatic oils including at least one of Myrcene, or Limonene.

12. The method of claim 1, wherein selecting the one or more chemicals includes:

selecting identifiers for one or more chemicals comprising a selected set of identified chemicals or active compounds including at least one of Tetrahydrocannabinol, Cannabidiol (CBD), Cannabigerol (CBG), Cannabichromene (CBC), Cannabielsoin (CBE) and Cannabinol (CBN); terpenes or other organic molecules and aromatic oils including at least one of Myrcene, Linalool, Humulene, Pinene, Limonene, Eucalyptol, Caryophyllene, or Borneol; and other flavonoids including at least one of Quercetin, Rutin, Apigenin, Naringenin, and Flavons.

13. The method of claim 1, wherein the flammable base substrate is any one of the following: hemp fiber, cotton, paper, grass, coconut husk, or other fillers.

14. The method of claim 1, wherein the chemical signature indicates to print a specified amount of chemicals in a specified portion of the printing, and the printing varies the amount of the specified chemical in accordance with the indication in the chemical signature.

* * * * *